(12) United States Patent
Slepinin

(10) Patent No.: US 9,710,808 B2
(45) Date of Patent: Jul. 18, 2017

(54) DIRECT DIGITAL CASH SYSTEM AND METHOD

(71) Applicant: Igor V. Slepinin, West Hartford, CT (US)

(72) Inventor: Igor V. Slepinin, West Hartford, CT (US)

(*) Notice: Subject to any disclaimer, the term of this patent is extended or adjusted under 35 U.S.C. 154(b) by 584 days.

(21) Appl. No.: 14/480,518

(22) Filed: Sep. 8, 2014

(65) Prior Publication Data

US 2015/0081566 A1 Mar. 19, 2015

Related U.S. Application Data

(60) Provisional application No. 61/878,165, filed on Sep. 16, 2013.

(51) Int. Cl.
| | |
|---|---|
| G06Q 20/36 | (2012.01) |
| G06Q 20/40 | (2012.01) |
| G06Q 20/10 | (2012.01) |
| G06Q 20/02 | (2012.01) |
| G06Q 20/38 | (2012.01) |

(52) U.S. Cl.
CPC ......... *G06Q 20/3678* (2013.01); *G06Q 20/02* (2013.01); *G06Q 20/10* (2013.01); *G06Q 20/3829* (2013.01); *G06Q 20/401* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 8,160,966 B2* | 4/2012 | Al-Herz | G06Q 20/06 380/229 |
| 8,738,539 B2 | 5/2014 | Al-Herz | |
| 2013/0179337 A1 | 7/2013 | Ochynski | |
| 2014/0195440 A1 | 7/2014 | Al-Herz | |

OTHER PUBLICATIONS

Kumari et al., "Fair and Secure M-Cash," Jan. 19, 2005, 2006 IEEE International Conference on Granular Computing, p. 778-781.*

* cited by examiner

*Primary Examiner* — Steven Kim
*Assistant Examiner* — Kristin D Sandoval
(74) *Attorney, Agent, or Firm* — Matthew J. Patterson

(57) ABSTRACT

Methods and systems are provided for the exchange of digital cash employing protocols for various entities to separately certify the validity of the parties, values and transactions while maintaining the anonymity of the buyer or user of the digital cash. Encrypted connections are established allowing various parties to enter into transactions to buy, sell, exchange and recover digital cash using a secure method that protects the personal information and identity of the user. The parties exchange tokens for other value in a transaction of financial settlement between themselves and wherein they are the only parties with knowledge of the amount and description of the transaction and in this way mimics a traditional cash transaction.

14 Claims, 4 Drawing Sheets

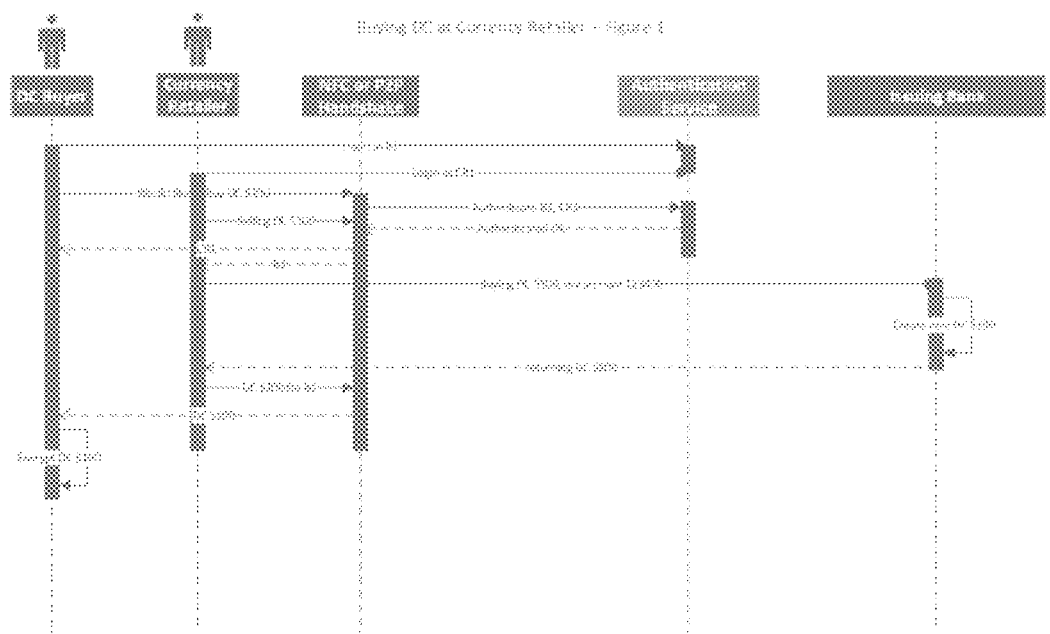

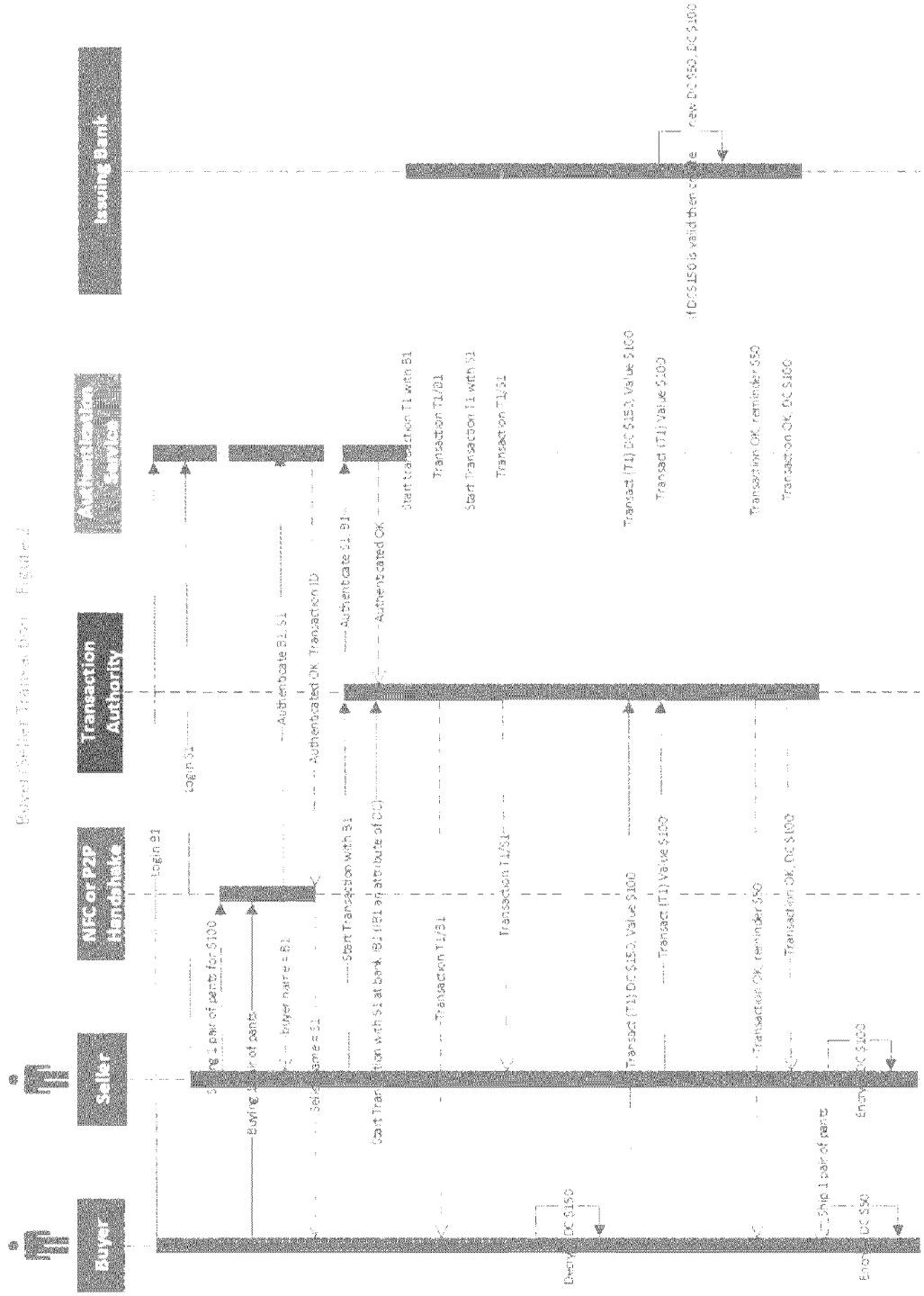

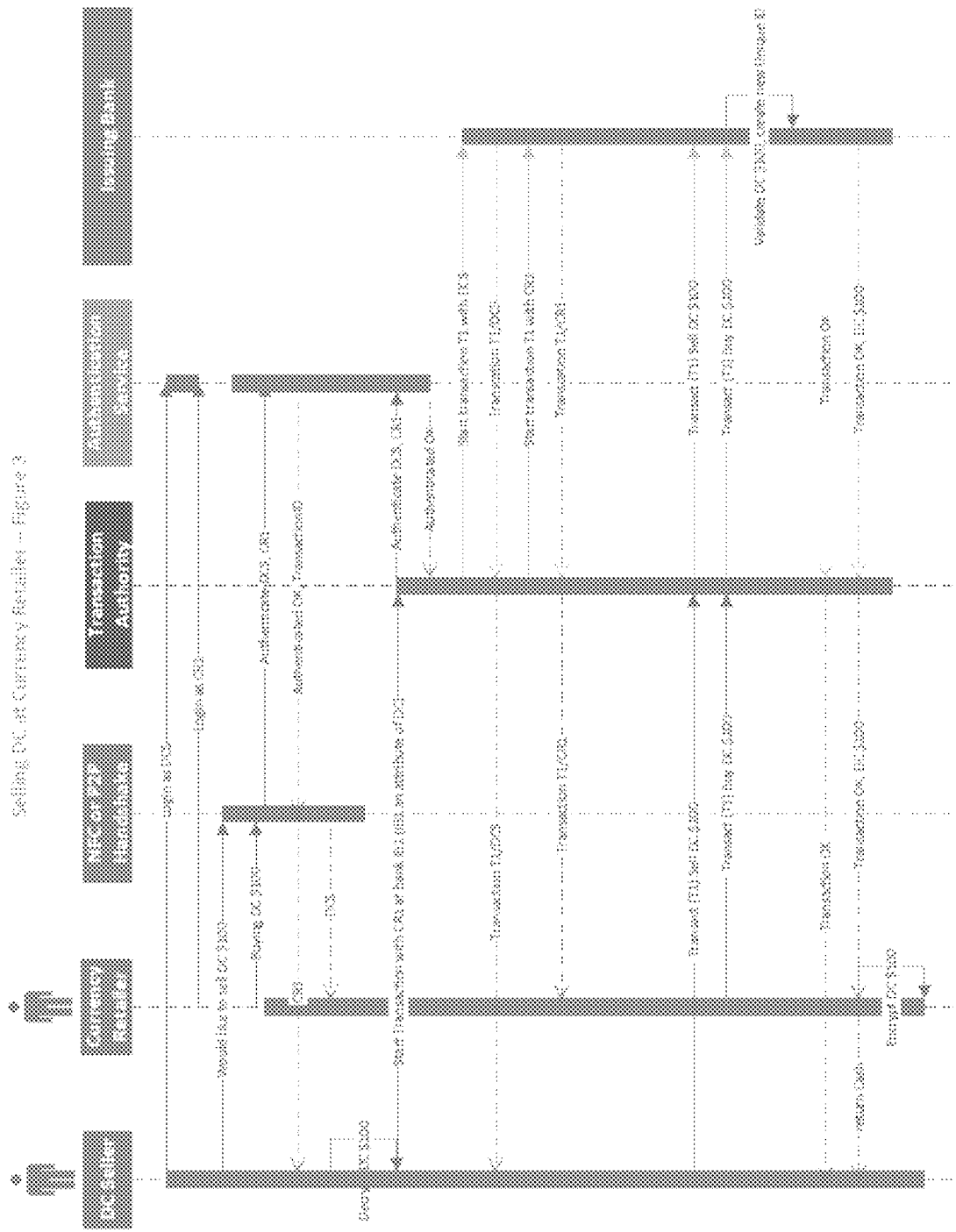

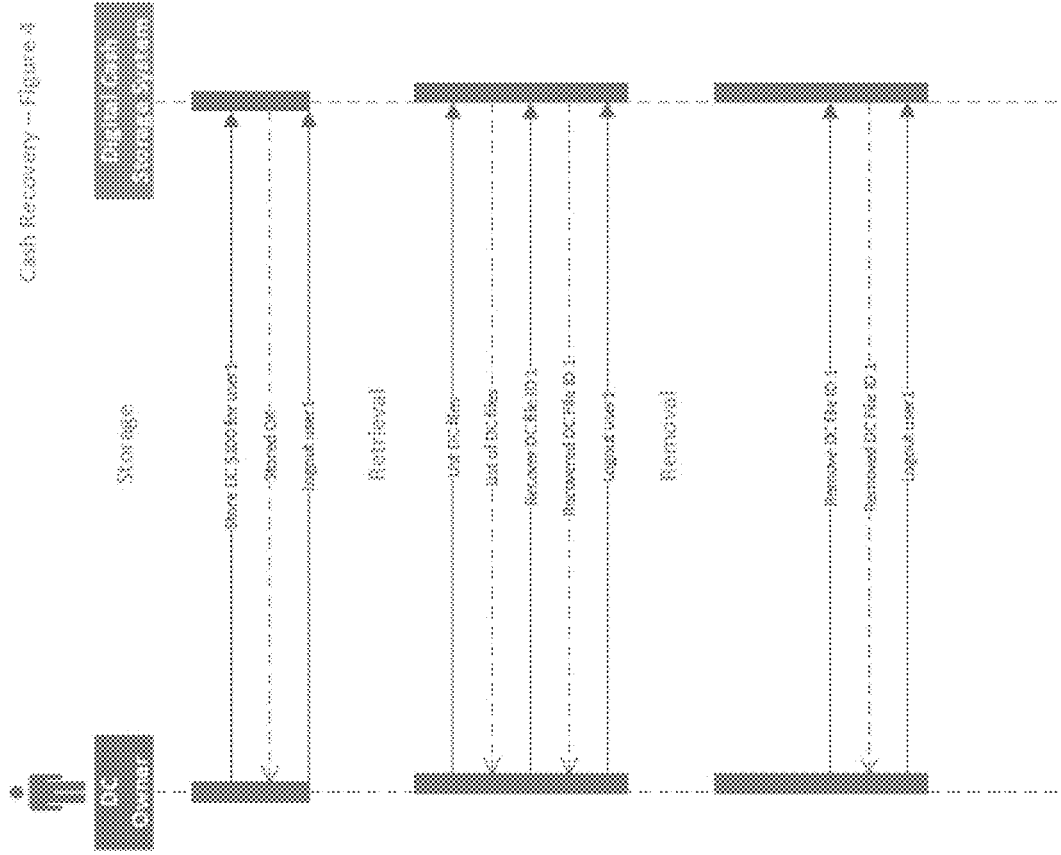

DIRECT DIGITAL CASH SYSTEM AND METHOD

CLAIM OF PRIORITY UNDER 35 U.S.C. §119

This application claims benefit of U.S. Provisional Patent Application No. 61/878,165, filed Sep. 16, 2013 and entitled "Electronic Token Which Can Be Spent Anonymously Yet Still Process Through Regulated Banking System, Like Cash", which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

Embodiments of the present invention relate to direct digital cash exchange systems and methods that protect anonymity and employ multiple layers of encryption. More specifically, the present invention relates to systems and methods of digital representations of currency that can be transferred with validity and anonymity closely approximating that of hard currency in an economy.

Description of the Related Art

Digital cash is a form of electronic money that is a digital equivalent of hard cash currency or asset value stored on an electronic device or remote server. There exists many forms of digital cash throughout the world and it is gaining in popularity for internet based transactions.

There are so-called centralized systems based on hard currency such as eCash, PayPal, WebMoney and the like. These systems "sell" electronic currency on the internet to users whom have provided personal identification and other information. They act as intermediaries and require verified payment methods such as credit cards and checking accounts all of which have their own personal information caches available for verification. Centralized systems gather and share the personal information of their users amongst the various parties that make up the systems. These systems further require audit accountability in much the way bank checking accounts do, while the normal use of hard cash does not. Still further, these centralized systems track all ends of a transaction and store this data on a central server subject to audit and compromise. There also exists decentralized electronic currency system based on cryptocurrency that secure transactions using cryptography and control the creation of new units of currency. Examples of cryptocurrency systems include Bitcoin and Litecoin. The decentralized electronic currency systems of the prior art also require identification of users and Bitcoin even publishes its blockchain or public ledger. Many of the cryptocurrency systems have values that are not based on legal currency. There are concerns about the apparent conflict with existing banking systems, liquidity, and the sometimes volatile fluctuation of the currency within the markets.

The prior art includes U.S. Pat. No. 8,738,539 purporting to provide privacy protection for the user. It is a virtual account based digital cash system employing two pairs of private and public keys. Although the system described does not use any blind signature schemes, it requires the users to give up privacy by providing personal information to establish the virtual accounts with the issuer of digital cash virtual accounts and wherein such personal information is stored with the issuer of digital cash virtual accounts.

There are several other problems associated with the electronic currency systems that currently exist. The overarching problem is that although they are commonly referred to as "digital cash" they do not operate in the anonymous fashion of hard cash. When a person walks into a brick-and-mortar store and purchases something using hard currency the sales person (or automated point of sales machine) receives no information about that person. Since hard cash is fungible the cash that is used is virtually untraceable. When a person uses the electronic currency systems of the prior art a great deal of their personal information is required. The mere divulgence of such information is a problem for many people.

Another problem with handing over personal information to third party electronic currency providers is identity theft. When a third party stores unencrypted personal information of users it allows any hacker to steal and use the information for nefarious means.

The loss of personal privacy alone is yet another problem of the electronic currency systems of the prior art. Even partially encrypted systems yield metadata vulnerable for hackers to seize and exploit. The data is mined automatically using software and can be used to investigate or target someone in particular. If, for example, someone pays their heart physician using an electronic currency system a third party can use that data to infer that the user is having heart problems.

Accordingly, there is a need for a secure electronic currency system that allows for the direct exchange of a digital form of cash by a user, based on hard currency, that allows for full anonymity of the user.

SUMMARY OF THE INVENTION

Embodiments of the present invention generally relate to a method for exchanging digital cash wherein a buyer having an anonymous buyer user id requests the issuance of a digital cash token having a value from a currency retailer; the buyer communicates with an authentication service using the buyer user id; the currency retailer has a currency retailer user id communicates with the authentication service; the authentication service verifies the buyer user id and the currency retailer id; a secure electronic communication channel is established between the buyer and the currency retailer; the buyer remits cash to the currency retailer; the currency retailer communicates with an issuing bank and requests the generation of the token; the issuing bank debits an amount of money from an account of the currency retailer; the issuing bank generates the token and transfers the token to the currency retailer; and the currency retailer transfers the token to the buyer. One embodiment of the present invention provides for the value of the token being approximately equal to the amount of money debited from the account of the currency retailer.

Another embodiment of the present invention is a method wherein the buyer contacts a seller that has a seller id and requests a transaction that has a value; the buyer communicates with the authentication service using the buyer user id; the seller communicates with the authentication service using the seller id; the authentication service verifies the buyer user id and the seller id and issuing a transaction id to the buyer and seller; e a secure electronic communication channel is established between the buyer and the seller; the buyer and seller communicate the transaction id with a transaction authority; the transaction authority communicates with the authentication service to verify the buyer id, the seller id and the transaction id; the authentication service verifies the buyer id, the seller id and the transaction id and communicates the verification to the transaction authority; the seller requests the transaction authority to initiate the transaction with the buyer; the buyer requests the transaction authority to initiate the transaction with the seller; the buyer communicates the identity of the issuing bank to the transaction authority; the transaction authority facilitates the establishment of a secure buyer communication channel between the buyer and the issuing bank; the buyer transfers the token to the issuing bank using the buyer communication channel; the transaction authority facilitates the establishment of a secure seller communication channel between the seller and the issuing bank; the issuing bank generates a second token that has a value and transfers the second token to the seller using the seller communication channel; and the seller completes the transaction with the buyer.

Yet another embodiment of the present invention provides for a method wherein the value of the first and second tokens have an equivalent value and represent the value of the transaction.

Yet another embodiment of the present invention is a method wherein the value of the first token represents a value greater than the value of the transaction and the second token represents a value equivalent to the value of the transaction, and further comprises the issuing bank generating a third token and transfers the third token to the buyer using the buyer communication channel, wherein the value of the third token represents the difference between the value of the first token and the value of the second token.

Yet another embodiment of the present invention is a method wherein the buyer contacts the currency retailer and requests a transaction; the buyer communicates with the authentication service using the buyer user id; the currency retailer communicates with the authentication service using the currency retailer id; the authentication service verifies the buyer user id and the currency retailer id and issuing a transaction id to the buyer and seller; the buyer and currency retailer communicate the transaction id with a transaction authority; the transaction authority communicates with the authentication service to verify the buyer id, the currency retailer id and the transaction id; the authentication service verifies the buyer id, the currency retailer id and the transaction id and communices the verification to the transaction authority; the currency retailer requests the transaction authority to initiate the transaction with the buyer; the buyer requests the transaction authority to initiate the transaction with the currency retailer; the buyer communicates the identity of the issuing bank to the transaction authority; the transaction authority facilitates the establishment of a secure buyer communication channel between the buyer and the issuing bank and facilitates the establishment of a secure currency retailer communication channel between the currency retailer and the issuing bank; the buyer transfers the token to the issuing bank using the buyer communication channel; the issuing bank generates a second token and transfers the second token to the currency retailer using the currency retailer communication channel; the currency retailer completes the transaction with the buyer.

Yet another embodiment of the present invention is provides for a method wherein the transaction is the exchange of the digital cash token for cash.

Yet another embodiment of the present invention is a method wherein the buyer generates a recovery copy of the digital cash token and the buyer stores the recovery copy of the digital cash token with a digital cash storage system provider.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a diagram conceptually illustrating the direct purchase of digital cash by a user from a currency retailer, according to an embodiment of the present invention.

FIG. 2 is a diagram conceptually illustrating transaction of digital cash between a buyer and seller, according to an embodiment of the present invention.

FIG. 3 is a diagram conceptually illustrating the selling of digital cash by a currency retailer, according to an embodiment of the present invention.

FIG. 4 is a diagram conceptually illustrating the recovery of a digital cash file from a digital cash recovery system provider by a digital cash owner, according to an embodiment of the present invention.

DETAILED DESCRIPTION

As described above, current systems of electronic currency require identification of personal information that can lead to privacy and identity theft concerns.

Accordingly, what is needed is a truly anonymous digital cash system based on hard currency with adequate verification and liquidity protocols that closely approximates that of hard currency in an economy.

Embodiments of the present invention provide for systems and methods of a direct exchange of digital cash that function like hard currency in a transaction. As will be more fully described herein below the digital cash of the present invention takes the form of an electronic file or token that represents actual value, as opposed to instructions on how to access value; the token is not tied to an account (virtual or otherwise); the token and transaction system do not require the owner to provide personal identification to obtain or spend, or otherwise exchange the token; the information is not recorded nor is any information stored by any central authority that can provide an uninterrupted audit trail of token exchanges or underlying transactions. The exchange of digital cash in accordance with methods of the present invention provide for non-reversible transactions with almost instantaneous clearing time.

The direct digital cash system of the present invention provides the owner of the digital cash physical possession of the token on a computing device and in this way functions like the ownership and possession of hard cash. As will be more fully described herein after the digital cash system of the present invention is not a bearer system in totality such that the loss of a token is not like the loss of cash. Aspects of the present invention include the existence of a reference copy of the token that can be accessed by an owner in possession of a decryption key in the case of loss or theft. An owner's physical possession of the token allows the system to process a purchase transaction much like cash is processed. A seller does not need personal identification for the owner, but only needs to know the token is valid or otherwise not counterfeit.

The present invention provides protocols for various entities to separately certify the validity of the parties, values and transactions. The present invention includes a buyer, a seller, a currency retailer, an authentication service, a transaction authority, an issuing bank and a digital cash storage service provider. The currency retailer acts as an intermediary between a buyer of digital cash and the issuing bank. The currency retailer exchanges hard currency with the buyer and purchases a token form the issuing bank on the buyer's behalf. The issuing bank provides for the validity of the token as well as its ultimate liquidity. The issuing bank tracks only the value and validity of the token and has no personal information of the parties or the transaction. The transaction authority validates the system identity of the parties, but not their personal identity or other metadata. The transaction authority has no currency value or other information about the transaction. The owner and seller exchange tokens for other value in a transaction of financial settlement between themselves and wherein they are the only parties with knowledge of the amount and description of the transaction and in this way mimics a hard cash transaction. The present invention provides for electronic, encrypted and secure protocols enabling transactions to occur almost instantaneously without the need for clearing time. If any of the validity or verification steps fail the process rolls back to the initial state.

The present invention partially relies on encryption to preserve the anonymity of the user and the security of the digital cash system. The digital cash system utilizes two layers of security employing the same types of encryption at an initiating bank and at the digital cash owner. The bank and digital cash owner each possess their own digital certificate in the form an electronic document to prove ownership and authentication of their respective public keys with various entities as will be more fully described herein below. The bank utilizes its digital certificate to sign and verify a token, and a buyer or seller (token owner) uses their digital certificate to sign the owned token in their possession to prevent theft. The use of these encryption levels in various transactions and exchanges will be described in more detail herein below. The encryption method of the present invention, also known in the art as asymmetric cryptography, includes a set of algorithms which require two separate keys, one of which is private and one of which is public. These pairs of keys are mathematically linked. The public key is generated and used by the digital cash owner to encrypt a portion of the file that makes up of the digital cash token. The private key is used to decrypt the token file. The term "asymmetric" as used herein refers to the use of different keys to perform these opposite functions, each the inverse of the other.

In accordance with the present invention, a token is generated in the form of a data file that is first encrypted using the digital certificate of the issuing bank and then digitally signed by the issuing bank before the digitally signed data file is passed to the token owner, i.e. a buyer, currency retailer, seller or other party. Once the owner receives the token in the form of the data file digitally signed by the issuing bank the owner uses their digital certificate to encrypt the token and then digitally sign the token and retains the digitally signed file on their computing device. These two layers of encryption, one at the issuing bank and one at the owner, are an important aspect of the present invention. Only the issuing bank can verify the validity of the digitally signed data file by using the issuing bank's private key. In addition, if the token is stolen or otherwise comprised, without decryption by the owner using the owner's private key, the token cannot be decrypted by bank and therefore cannot be verified or used in a transaction. In order for the token to be exchanged in a transaction the owner must decrypt the token using the owner's private key and the bank must verify the validity of the token using the bank's private key.

It is well known to generate a public and private key-pair and to use them for encryption and decryption. The present invention includes electronic wallets that include a public key and a private key that may be used to encrypt a token in the possession of an owner as described herein above. The present invention exploits the fact that it is computationally infeasible for a properly generated private key to be determined from its corresponding public key. The public key algorithms of the present invention do not require a secure initial exchange of one (or more) secret keys between the parties.

The digital cash system of the present invention utilizes an electronic wallet that resides at least on the digital cash owner's computing device. Although electronic wallets are well known in the industry, the common electronic wallet or digital wallet has both a software and information component. The software logic of the present invention provides security and encryption to safeguard the privacy of the personal information and that of the actual transaction. Typically, digital wallets are stored on the client side and are easily self-maintained and fully compatible with most e-commerce Web sites. The electronic wallet of the present invention contains no personal information and does not store information related to any particular transaction. The electronic wallet of the present invention instead includes software protocols that are capable of encrypting a token using a public key certificate, a private key, and is capable of producing a recovery copy of the token that is stored on a digital cash storage system provider's computing system as described more fully herein below.

As used herein, an authentication service is an entity that electronically verifies the digital identity of a party to a transaction in accordance with the present invention. The authentication service verifies the identity of a party to a transaction, a buyer, seller, initiating bank, etc., by using a unique user identification, digital certificate and password. The user identification and password are stored at the authentication service. The authentication service does not possess, use or store any information about the transaction or a party's personal or true identity. When making a transaction the authentication service uses the parties' user identification, digital certificate and password to verify that they are who they say they are.

As used herein the currency retailer is an entity that has the ability to work with an issuing bank and deals in the exchange of hard currency, or its anonymous equivalent, for digital cash as will be more fully described herein after. The currency retailer of the present invention may be comprised of multiple competing entities offering their service to users throughout the world. The currency retailer has the ability to communicate with an authentication service for verification of a party's digital identity and for providing digital information for establishing a direct encrypted connection between the currency retailer and a user or buyer of digital cash.

The issuing bank of the present invention comprises any banking entity, including traditional brick-and-mortar banks, with the capability to electronically exchange currency for digital tokens with currency retailers, token owners and sellers in the manner described herein below. In general, the issuing bank joins a direct encrypted connection with a currency retailer to issue an encrypted token to the currency retailer who in turn passes the token to a buyer. In the case of an exchange of a token in a transaction, the issuing bank joins separate direct encrypted connection with other parties to the transaction in order to facilitate the exchange of the token.

The transaction authority of the present invention may comprise an electronic online entity that is accessible by a buyer and a seller or other party to a transaction. The user id's of the buyer and seller are verified to the transaction authority by the authentication service. The transaction authority facilitates the establishment of a direct encrypted connection in response to member parties' requests. In accordance with the present invention two (or more) parties to a digital cash transaction log into the transaction authority with their respective user id's and passwords requesting the establishment of a direct encrypted connection between the requesting parties through the transaction authority, which parties may include a buyer, a seller and an issuing bank as will be more fully described herein after. Once the parties' anonymous identities have been authenticated by the authentication service a direct encrypted connection may be established between the requesting parties. Because the data being exchanged via the direct encrypted connections is in fact encrypted, the transaction authority has no visibility to the parties' actual identities or the underlying transaction.

The present invention includes a digital cash storage service that comprises an entity capable of electronically storing a recovery file of a token and further providing for retrieval of the token by an owner supplying an anonymous user id and password. As described more fully herein below the digital cash storage service provider of the present invention has the capability to maintain a secure twenty four hour, seven day a week server based service to handle storage of token files. The digital cash storage service retrieves and restores the token file an owner after a request by the owner and authentication of the owner's id and password.

The present invention is not limited to specific types of communication and processing devices. The digital cash systems and methods of the present invention may send and receive data via any number of communications paths and may include one or more processing devices, such as, for example, a computing device, such as a processor, a microprocessor, a microcomputer, a personal computer, a server, a laptop, a mobile communications device or phone, a smart card (with an embedded microprocessor), a smartphone, or a combination of two or more of these devices capable of responding to, generating, and/or executing instructions in the manner described herein. The processing device of the present invention may include any known storage, interface, communications protocol or the like in various combinations.

The processing devices of the present invention also may include one or more software applications including, for example, encryption decryption software, signature generating software, key generating software, random number generating software, signature verification software, in addition to other system and operating system software to command and direct the processing device. Software applications may be implemented as a computer program, a piece of code, an instruction, or some combination thereof, for independently or collectively instructing the processing device to interact and operate as desired.

The software applications of the present invention may be embodied permanently or temporarily in, or in communication with, the processing device. In particular, the applications may be stored on a storage medium or device including volatile and non-volatile such that if the storage medium or device is read by the processing device, the methods of the present invention may be carried out.

The processing device of the present invention also may include one or more communications interfaces that allow the processing device to send and receive information using the communications paths. The communications paths may be configured to send and receive signals (e.g., electrical, electromagnetic, or optical) that convey or carry data streams representing various types of analog and/or digital data. For example, the communications paths may be implemented using various communications media and one or more networks comprising one or more network devices (e.g., servers, routers, switches, hubs, repeaters, and storage devices). The one or more networks may include a local area network (LAN), a wide area network (WAN), or other known secure communications networks.

The digital cash system of the present invention, as will be more fully explained herein below, includes the following steps or procedures: an owner engages a currency retailer to obtain digital cash or a token and the currency retailer engages an issuing bank to issue a token (purchasing of token); the owner engages a seller to exchange the token for value (transaction); the seller engages the issuing bank to exchange the token for hard currency (final exchange); the digital cash owner stores and retrieves a recovery file copy of the token (cash recovery).

Purchasing Tokens

FIG. 1 is a diagram illustrating example operations for a user or digital cash buyer to purchase digital cash from a currency retailer and operations for a currency retailer to receive digital cash from an issuing bank.

Digital cash buyer B1, perhaps using an electronic wallet on a computing device, informs currency retailer CR1 of the desire to purchase digital cash. This can be done in-person, as in a point of sale environment, or using any number of electronic means including NFC and prepaid debit cards. Both B1 and CR1 may have an electronic wallet on a smartphone or other computing device and a membership with an authentication service that has the ability to facilitate the establishment of a direct encrypted connection between the parties. B1 and CR1 log into communication with the authentication service using a user name and password to initiate an anonymous handshake (Login as B1, Login as CR1) and request authentication of the parties (Authenticate B1, CR1). The authentication service verifies the parties as members of the authentication service (Authentication OK) and a direct encrypted connection may be established between B1 and CR1. B1 makes a request for a denomination of digital cash (DC). In the example shown in FIG. 1 the requested amount is $100 (Would like to buy DC $100). CR1 indicates that it is willing to sell digital cash to B1 in response the request (Selling DC $100). B1 pays CR1 $100 either in-person or through some anonymous electronic cash equivalent means. CR1 contacts an issuing bank IB and requests that the IB establish a direct encrypted connection communication with CR1. CR1 requests a DC token in the amount of $100 (Buying DC $100, my account 123456). CR1 pays IB using an account number resident with IB or other electronic means such as an automated clearing house. IB has no knowledge of B1 or any future transaction concerning B1 or involving the token to be issued.

Still referring to FIG. 1, the IB uses the funds from CR1 and creates a token representing digital cash in the amount of $100 (Create new DC $100). The IB issues the token in the form of an electronic file and sends it to CR1 over the established encrypted connection (returning DC $100). The token that IB issues is an electronic file that is signed and encrypted by IB with a private key and is signed with a public key certificate, or digital certificate, using appropriate known protocols. The IB maintains a reference copy of the token including a unique identification number and the value of the token. The IB retains the private key as part of owing a digital certificate and has the responsibility for exchanging the token as part of a transaction and for fulfilling the value of the token for conventional cash at a future date during the final exchange as will be more fully explained herein below. The value of the token and the identification of the IB are available in the token's file in unencrypted or open form.

Once CR1 receives the token from IB the token is sent to B1 via a direct encrypted communication channel (DC $100 for B1) and is deposited into the electronic wallet of B1's smartphone or other computing device (DC $100). The electronic wallet of the present invention includes software logic that encrypts the incoming token with B1's digital certificate (Encrypt DC $100). CR1 has no knowledge of the future transaction(s) contemplated or consummated by B1.

After B1 stores the encrypted token on a smartphone or computing device the electronic wallet prepares a recovery file of the token and passes this file to a digital cash storage system provider. The digital cash storage system stores the recovery file on a computer system or server for use in the event that token that is lost, stolen or otherwise compromised as will be described in more detail herein after with reference to FIG. 4.

In accordance with the present invention the purchase of digital cash by a buyer is a non-reversible transaction in that the token must be exchanged in a transaction or at a currency retailer with the issuing bank as described herein below with reference to those processes.

Transaction

FIG. 2 is a diagram illustrating example operations for a user or digital cash owner to purchase goods or services from a seller. It should be appreciated that an owner of digital cash could simply gift or transfer the token to a subsequent owner using the same operations described herein after in lieu of an exchange for value.

The owner of the token, or buyer in this example B1, owns a token worth $150 and has possession of the encrypted token in an electronic wallet on a smartphone or computing device. B1 contacts a second party, or seller of goods S1, wherein S1 in the example shown in FIG. 2 is a seller of pants valued at $100. Both B1 and S1 have an electronic wallet on a smartphone or other computing device and a membership in an authentication service capable of facilitating the establishment of a direct encrypted connection between the B1 and S1. B1 and S1 log into the authentication service using a user name and password to initiate an anonymous handshake (Login B1, Login S1). The authentication service verifies the parties as members of the authentication service and may facilitate the establishment of a direct encrypted connection between B1 and S1 (Authenticated OK). B1 identifies the nature of the transaction which may include quantities, shipping instructions, etc., with S1 (Buying 1 pair of pants) and S1 indicates its willingness and ability to fulfill the transaction for a specific price (Selling 1 pair of pants for $100). The authentication service facilitates the ability of B1 and S1 to exchange the digital identification with each other (Buyer name=B1, Seller name=S1) wherein the identity of B1 is in the form of an anonymous user name and the personal identity is not known and cannot be divulged. The authentication service generates a unique transaction identification number and communicates the number to B1 and S1 (Transaction ID). B1 and S1 contact a transaction authority and identify themselves only using user names (or ids) and the transaction identification number issued by the authentication authority (Start Transaction with B1, Start Transaction with S1 at IB1). In addition, B1 communicates the identity of the IB that generated the token to the transaction authority. The transaction authority contacts the authentication service using the user names and transaction identification number to verify parties to the transaction as well as the membership of B1 and S1 with the authentication service (Verify S1, B1). The authentication service alerts the transaction authority if the authentication service can verify that B1 and S1 are members of the authentication service (OK). In essence, the transaction authority is verifying that B1 and S1 are who they say they are without gaining or divulging any personal or transactional information. If verification is not established the transaction is cancelled.

Once the transaction authority receives verification of the identity of B1 and S1, it facilitates the establishment of a direct and encrypted end to end connection between B1 and IB and S1 and IB. The encrypted communications go through the transaction authority but the transaction authority gains no visibility or other information regarding the transaction because the communications going through the transaction authority are encrypted. The transaction authority instructs IB to initiate a transaction with B1 by providing IB with the user name of B1 and the transaction ID. The IB communicates with B1 as described above (Transaction T1/B1). The transaction authority instructs IB to initiate a transaction with S1 by providing IB with the identity of S1 and the transaction ID. The IB communicates with S1 directly as described above (Transaction T1/S1). B1 decrypts the token in its possession (Decrypt DC $150) and passes the decrypted token and the transaction ID to the IB electronically using the aforementioned encrypted communication channel (Transact (T1) DC $100, Value $150). S1 informs the IB of the value of the transaction and the transaction ID (Transact (T1) Value $100). The IB has no personal or transactional information other than that transactional information described immediately above and communicated by B1 and S1 via the separate direct encrypted connections. The instructions from B1 and S1 to the IB must match in order for IB to process the transaction. In the example shown in FIG. 2 B1 instructs IB to issue two new tokens and to destroy the original decrypted token that it received from B1. The IB uses its private key to decrypt its layer of encryption of the token to validate the token (If cash DC $150 valid then create new DC $50, $150). In the example shown in FIG. 2 if the IB verifies the validity of the $150 token then it destroys the original token and annotates the reference copy to indicate that the token has been spent or otherwise exhausted to prevent possible future fraud. If IB cannot verify the validity of the token the transaction is cancelled. Again with reference to the example in FIG. 2, B1 instructed that two new tokens should be generated by IB, namely one for a value of $100 and one for a value of $50.

The IB uses the funds from original $150 token that it received from B1 and issues a first token to S1 representing digital cash in the amount of $100 (Transaction OK, DC $100) and issues a second token to B1 representing digital cash in the amount of $50 (Transaction OK, reminder $50). These tokens are generated by the issuing in the exact same manner as those described herein above referring to the purchase of digital cash. The IB maintains a reference copy of the tokens including the unique digital identification and the values of the tokens. The IB further retains its private key as described herein before. The value of the tokens and the identification of the IB are available in the files in unencrypted or open form.

The $100 and $50 tokens from IB are passed to B1 and S1 respectively in the direct encrypted communication scheme described above. The IB sends the $100 token to S1 to satisfy the transaction price via the direct encrypted channel and it is deposited into the electronic wallet of S1's computing device. The electronic wallet of S1 signs and encrypts the $100 token (Encrypt DC $100). S1 fulfills the transaction in accordance with the instructions provided by B1 as described herein above (Ship 1 pair of pants). The IB has no knowledge of the transaction or the future transaction(s) contemplated by S1 using the token. Similarly, and simultaneously, IB sends the $50 token to B1 to satisfy the difference between the value of the original $150 token and the transaction price reflecting the change due to B1. The $50 token is sent via the direct encrypted channel and it is deposited into the electronic wallet of B1's computing device. The electronic wallet of B1 signs and encrypts the $50 token (Encrypt DC $50). Again, IB has no knowledge of this transaction or the future transaction(s) contemplated or eventually consummated by B1 or S1.

Although it is depicted in FIG. 2 that there is a single transaction, i.e. B1, S1, T1, it should be appreciated by those skilled in the art that tokens may be exchanged between multiple parties involving multiple transactions in the manner described herein above without being converted to hard currency as an intermediate step.

Exchanging Tokens

It is contemplated by the present invention that issued tokens will be exchanged between parties as well as converted to hard currency or cash at a future date. FIG. 3 is a diagram illustrating example operations for a digital cash owner to exchange a token for hard currency. The exchange of digital cash for hard currency is similar to that described herein above relating to transactions involving the purchase of goods or services where in this particular situation the transaction is the exchange of a token for hard currency.

The owner of the token, or digital cash seller, DCS, in the example shown in FIG. 3, owns a token worth $100 and has possession of the token in an electronic wallet on a smartphone or computing device. DCS contacts a currency retailer CR1. Both DCS and CR1 have an electronic wallet on a smartphone or other computing device and a membership with an authentication service. DCS and CR1 log into the authentication service using a user name and password to initiate an anonymous handshake (Login as DCS, Login as CR1). The authentication service verifies the parties as members of the authentication service (Authenticate DCS, CR1, Authenticated OK) and facilitates the establishment of a communications channel, in some embodiments a direct encrypted connection, between DCS and CR1 (CR1, DCS). DCS requests the value of the token it wishes to exchange to CR1 and CR1 communicates its willingness to exchange the token for hard currency (Would like to sell DC $100, Buying $100). The authentication service generates a unique transaction identification number and communicates the number to DCS and CR1 (Transaction ID). DCS contacts a transaction authority and identifies itself only using its user name and the transaction identification number (Start transaction with CR1 at bank IB1). DCS also communicates the name of the IB that generated the token to the transaction authority. The transaction authority contacts the authentication service using the user names and transaction identification number to verify the transaction id and membership of DCS and CR1 with the authentication service (Verify DCS, CR1). If the information regarding DCS, CR1 and the transaction ID match the authentication services issues a verification to the transaction authority (OK). If the information cannot be verified by the authentication authority the transaction is cancelled.

The transaction authority uses the verified and communicated information to alert the IB to the parties and the transaction and facilitates the establishment of an encrypted communication channel between DCS and IB (Start transaction T1 with DCS, Start transaction T1 with CR1) and an encrypted communications channel between CR1 and IB. IB communicates with DCS and CR1 the receipt of the request to start the transaction (Transaction T1/DCS, Transaction T1/CR1). DCS decrypts the token (Decrypt DC $100) and passes the token to the IB and instructs the IB on what to do with the token (Transact (T1) Sell DC $100). CR1 informs IB of its willingness to accept the transaction, that is to exchange the token and take possession of the subsequently issued token (Transact (T1) Buy DC $100). The IB has no personal or transactional information other than what to do with the token. In the example shown in FIG. 3 the DCS instructs IB to issue a new token and to destroy the original decrypted token. The IB uses its private key to decrypt its layer of encryption in order to validate the token. In the example shown in FIG. 3 if the IB verifies the validity of the $100 token, it destroys the original token and annotates the reference copy to indicate that the token has been spent or otherwise exhausted. Again with reference to the example in FIG. 3, CR1 instructed that a new token should be generated for a value of $100.

The IB uses the funds from original $100 token that it received from the DCS and prepares to issue a token to the DCS representing digital cash in the amount of $100. This token is generated in exactly the same manner as those described herein above referring to the purchase of digital cash. The IB creates a new token with a unique identification and maintains a reference copy of the token including a unique digital identification and the value of the token (Validate DC $100, create new Unique ID). The value of the tokens and the identification of the IB are available in the files in unencrypted or open form.

The IB sends the $100 token to CR1 to via the direct encrypted channel and it is deposited into the electronic wallet of CR1's computing device (Transaction OK, DC $100). CR1 uses its electronic wallet, or other computing device, to encrypt the $100 token as described herein before. Likewise, and simultaneously, IB sends confirmation to DCS of the issuance of the new token to CR1 (Transaction OK). CR1 then pays the DCS $100 in cash in a person-to-person exchange, a prepaid debt card, through an automated clearing house transaction or other procedure that provides for an exchange that preserves the personal identity of DCS (return Cash).

Although not shown in FIG. 3, it should be appreciated by those skilled in the art that CR1 could also demand direct cash payment from the IB in lieu of a subsequently issued token.

Cash Recovery Method

The present invention includes systems and methods for recovering the value of a token that is lost, stolen or otherwise compromised through a digital cash storage service. With specific reference to the Storage portion of FIG. 4, and as described herein above, at the time of purchase of a token, the electronic wallet of a digital cash buyer or owner prepares a recovery file of the token that includes owner's personal system identification and password. The owner of the token logs into the digital cash storage system with owner's personal system identification and password (login user1 using pwd). The owner then passes the recovery file to the digital cash storage system provider (Store DC $100 for user1). The digital cash storage system provider stores the recovery file and sends verification to the owner (Stored OK. The owner then logs out of the digital cash storage system provider's system (Logout user1). With reference to the Retrieval portion of FIG. 4, in an event such as loss, theft or compromise, the owner logs onto the digital cash storage system using its user id and password (Login user1 using pwd). The DCO alerts DCSS provider that DCO needs to recover a lost token using the stored recovery file by requesting a listing of the digital cash files that the digital cash storage system provider has on file for the owner (List DC files). The digital cash storage system provider sends the owner a listing of the digital cash files in its possession and associated with the owner's user id and password (List of DC files). Using the information provided by the digital cash storage system provider the owner identifies the file for token of interest and request the recovery of that specific file (Recover DC file ID 1). The digital cash storage system provider sends an electronic copy of the recovery file to DCO (Recovered DC File ID1). The DC then logs out of the digital cash storage system provider's system (Log out user 1). The recovery file is identical to the encrypted version of the token that was initially received by the DCO from the currency retailer of issuing bank as described herein above. Once the token file is restored by the DCSS the DCO stores the token on a smartphone or computing device in the electronic wallet.

Now with reference to the Removal portion of FIG. 4, the procedures associated with removing recovery files from the digital cash storage system of the present invention is described. Once a token is exchanged the need for a recovery file is obsolete. After the token is exchanged the owner of the token logs into the digital cash storage system with owner's personal system identification and password (login user1 using pwd). The owner then requests the removal of a specific recovery file (Remove DC file ID1). The digital cash storage system provider deletes the recovery file and sends verification to the owner (Removed DC File ID 1). The owner then logs out of the digital cash storage system provider's system (Logout used). It should be appreciated by those skilled in the art that electronic wallet of the DCO may have software protocol sufficiently enabled to allow the forgoing removal process to occur automatically upon exchange of the token.

Although the recovery procedures have been described with reference to a file associated with a single token it should be understood that the present invention contemplates that multiple recovery files associated with multiple tokens could be recovered simultaneously.

The invention claimed is:

1. A method of digital cash exchange comprising:
    providing a first user with a first user id, and a first user password, and providing a second user with a second user id, and a second user password;
    providing an electronic wallet of a first user device of the first user with a first encrypted digital cash token having a specific amount, wherein the first encrypted digital cash token is generated by first encrypting a first digital cash token using an encryption key of an issuing bank, and further encrypting using an encryption key of the first user;
    the electronic wallet of the first user device sending a request for an anonymous transaction having a transaction amount to an electronic wallet of a second user device;
    the first user device of the first user logging-in to an authentication service using only the first user id and the first user password;
    the second user device of a second user logging-in to the authentication service using only the second user id and a second user password;
    the authentication service verifying the identity of the first user device and the second user device using only the first user id, the first user password, the second user id, and the second user password;
    the authentication service, in response to verifying the identity of the first user device and the second user device, issuing a unique transaction id and sending the unique transaction id to the first user device and the second user device;
    the first user device and the second user device sending the unique transaction id, the first user id, and the second user id, to a transaction authority;
    the transaction authority requesting the authentication service to verify the first user id, the second user id and the transaction id;
    the authentication service verifying the first user id, the second user id and the transaction id and communicating the verification to the transaction authority;
    the first user device transmitting the id of the issuing bank id to the transaction authority;
    the second user device requesting the transaction authority initiate the anonymous transaction with the first user device;
    the first user device requesting the transaction authority initiate the anonymous transaction with the second user device;
    the transaction authority establishing a secure first user communication channel between the first user device and a device of the issuing bank and establishing a secure second user communication channel between the second user device and the issuing bank device;
    the first user device generating a first user decrypted digital cash token by decrypting the first encrypted digital cash token using the encryption key of the first user;
    the first user device transmitting the first user decrypted digital cash token, the transaction id, and a first set of transaction instructions, to the issuing bank device via the first user communication channel;
    the second user device transmitting a transaction value, transaction id, and a second set of transaction instructions, to the issuing bank device via the second user communication channel;

the transaction authority determining that the transaction id sent by the first user device and the first set of transaction instructions match the transaction id sent by the second user device and the second set of transaction instructions;

the transaction authority, in response to the transaction id sent by the first user device and the first set of transaction instructions matching the transaction id sent by the second user device and the second set of transaction instructions, initiating the anonymous transaction;

the issuing bank device decrypting the first user decrypted digital cash token using the encryption key of the issuing bank in response to the transaction authority initiating the anonymous transaction;

the issuing bank device surrendering the first digital cash token by destroying the first digital cash token;

the issuing bank device generating at least a second digital cash token in an amount equal to the transaction value, by including the issuing bank id, encrypting the second digital cash token with the issuing bank encryption key, and signing the second digital cash token with a digital certificate of the issuing bank;

the issuing bank transferring the second encrypted digital cash token to the second user device using the second user communication channel; and the second user device, in response to receiving the second encrypted digital cash token in the amount of the transaction value, completing the transaction with the first user device.

2. A method according to claim 1, further comprising:
issuing the first encrypted digital cash token comprising:
a currency retailer, a currency retailer id, and a currency retailer password;
the authentication service registering the first user, and the currency retailer, by storing only the first user id, the first user password, the currency retailer id, and the currency retailer password;
the first user device of the first user logging-in to the authentication service utilizing only the first user id and the first user password;
a currency retailer device of the currency retailer logging-in to the authentication service utilizing only the currency retailer id and the currency retailer password;
the authentication service initiating an anonymous handshake between the first user device and the currency retailer device;
the authentication service establishing a direct encrypted connection between the first user device and the currency retailer device;
the electronic wallet of the first user device sending, to the currency retailer device, via the direct encrypted connection, a purchase request for the first digital cash token in a the specific amount;
the first user device, receiving via the direct encrypted connection, a response agreeing to the purchase request, from the currency retailer;
the first user remitting cash in said specific amount to the currency retailer;
the currency retailer device, requesting a generation of the first digital cash token in the specific amount from an the issuing bank device, without transmitting any information about the first user;
the issuing bank device debiting said specific amount from an account of the currency retailer;
the issuing bank device, without any information about the first user, generating the first encrypted digital cash token in the specific amount by including an the issuing bank id, encrypting the first digital cash token with the bank encryption issuing bank encryption key, and signing the first encrypted digital cash token with a the digital certificate of the issuing bank;

the issuing bank device transferring the first encrypted digital cash token to the currency retailer device; and the currency retailer device transmitting the first encrypted digital cash token to the electronic wallet of the first user device; and the electronic wallet of the first user receiving the first digital cash token and encrypting the first encrypted digital cash token with the first user encryption key.

3. A method according to claim 1, wherein the second user is a seller.

4. A method according to claim 2, wherein the anonymous transaction is the exchange of the first encrypted digital cash token for cash and the method further comprising:
the second user remitting cash in the amount of the transaction value to the issuing bank.

5. A method according to claim 1, wherein when the transaction value is less than the specific amount of the first encrypted digital cash token, the method further comprising:
the issuing bank device generating a third digital cash token in an amount equal to the difference between the specific amount of the first encrypted digital cash token and the transaction value amount, by including the issuing bank id, encrypting the third digital cash token, and signing the third digital cash token with the digital certificate of the issuing bank; and
transmitting the third digital cash token to the electronic wallet of the first user device via the first user communication channel.

6. A method according to claim 2 further comprising the first user device generating a recovery copy of the first digital cash token.

7. A method according to claim 2 further comprising the first user device storing the recovery copy of the first digital cash token with a digital cash storage system provider.

8. A method according to claim 7 further comprising the first user device requesting the recovery copy of the first digital cash token from the digital cash storage provider and the digital cash storage provider delivering the recovery copy of the first digital cash token to the first user device.

9. A method according to claim 7 further comprising the first user requesting that the stored copy of the first digital cash token be removed from storage at the digital cash storage provider and the digital cash storage provider removing the recovery copy of the first digital cash token.

10. A method according to claim 2 wherein the currency retailer is the issuing bank.

11. A method according to claim 1, further comprising:
redeeming a digital cash token comprising:
a token seller, a token seller id, and a token seller password, a token buyer, a token buyer id, and a token buyer password;
the token seller having a redeemable encrypted digital cash token in a token seller electronic wallet, wherein the redeemable encrypted digital cash token is first encrypted using an encryption key of the issuing bank, and further encrypted using an encryption key of the token seller;
a token seller device of the token seller logging-in to an authentication service utilizing only the token seller id and the token seller password;
the token buyer device of a token buyer logging-in to the authentication service using only the token buyer id and a token buyer password;

the authentication service verifying the identity of the token seller device and the token buyer device using only the token seller id, the token seller password, the token buyer id, and the token buyer password;

the authentication service, in response to verifying the identity of the token seller device and the token buyer device, issuing a unique transaction id and sending the unique transaction id to the token seller device and the token buyer device;

the token seller device and the token buyer device sending the unique transaction id, the token seller id, and the token buyer id, to a transaction authority;

the transaction authority requesting the authentication service to verify the token seller id, the token buyer id and the transaction id;

the authentication service verifying the token seller id, the token buyer id and the transaction id and communicating the verification to the transaction authority;

the token seller device transmitting an issuing bank id to the transaction authority;

the transaction authority establishing a seller direct encrypted connection between the token seller device and the issuing bank;

the transaction authority establishing a buyer direct encrypted connection between the token buyer device and the issuing bank;

the token seller device decrypting the redeemable encrypted digital cash token;

the token seller device transmitting the token seller decrypted redeemable digital cash token, the transaction id, and a first set of redemption instructions, to the issuing bank device via the seller direct encrypted connection;

the token buyer device transmitting the transaction id, and a second set of redemption instructions, to the issuing bank device via the buyer direct encrypted connection;

the issuing bank device decrypting the token seller decrypted redeemable digital cash token and surrendering the token seller decrypted and issuing bank decrypted redeemable digital cash token;

the issuing bank device, without any information about the token seller, generating a redeemed digital cash token in a seller specified amount included in the first set of redemption transaction instructions, by including an issuing bank id, encrypting the redeemed digital cash token with the issuing bank encryption key, and signing the redeemed encrypted digital cash token with the digital certificate of the issuing bank;

the issuing bank device debiting the seller specified amount from an account of the token seller;

the issuing bank device transferring the redeemed encrypted digital cash token to the token buyer device using the token buyer direct encrypted connection;

the electronic wallet of the token buyer encrypting the redeemed encrypted digital cash token with an encryption key of the token buyer; and the token buyer remitting cash in the seller specified amount to the token seller.

12. A method according to claim 11 wherein the token buyer is a currency retailer.

13. A method according to claim 11 wherein the token buyer is the issuing bank.

14. A method according to claim 11, wherein when the seller specified amount is less than a value of the redeemable digital cash token, the method further comprising:

the issuing bank device generating a third digital cash token in an amount equal to the difference between the seller specific amount of the redeemed digital cash token and the value of the redeemable digital cash token, by including the issuing bank id, encrypting the third digital cash token, and signing the third encrypted digital cash token with the digital certificate of the issuing bank; and transmitting the third encrypted digital cash token to the electronic wallet of the token seller device via the seller direct encrypted connection.

* * * * *